(No Model.) 4 Sheets—Sheet 1.

L. R. BLACKMORE.
SECTIONAL BOILER FOR HOT WATER AND STEAM HEATING.

No. 591,806. Patented Oct. 19, 1897.

Attest:
L. Lee.
Edw. F. Kinsey

Inventor.
Lawrence R. Blackmore,
per Thomas S. Crane, Atty.

THE NORRIS PETERS CO., PHOTO-LITHO., WASHINGTON, D. C.

(No Model.) 4 Sheets—Sheet 2.
L. R. BLACKMORE.
SECTIONAL BOILER FOR HOT WATER AND STEAM HEATING.
No. 591,806. Patented Oct. 19, 1897.

Attest:
L. Lee
Edw. F. Kinsey

Inventor.
Lawrence R. Blackmore,
per Thomas S. Crane, Atty.

(No Model.) 4 Sheets—Sheet 3.

L. R. BLACKMORE.
SECTIONAL BOILER FOR HOT WATER AND STEAM HEATING.

No. 591,806. Patented Oct. 19, 1897.

Attest:
L. Lee.
Edw. F. Kinsey.

Inventor.
Lawrence R. Blackmore,
per Thomas S. Crane, Atty.

(No Model.) 4 Sheets—Sheet 4.

L. R. BLACKMORE.
SECTIONAL BOILER FOR HOT WATER AND STEAM HEATING.

No. 591,806. Patented Oct. 19, 1897.

Attest:
L. Lee
Edw. F. Kinsey

Inventor.
Lawrence R. Blackmore,
per Thomas S. Crane, Atty.

United States Patent Office.

LAWRENCE R. BLACKMORE, OF NEWARK, NEW JERSEY, ASSIGNOR TO THE BLACKMORE HEATING COMPANY, OF NEW JERSEY.

SECTIONAL BOILER FOR HOT-WATER AND STEAM HEATING.

SPECIFICATION forming part of Letters Patent No. 591,806, dated October 19, 1897.

Application filed February 19, 1897. Serial No. 624,237. (No model.)

*To all whom it may concern:*

Be it known that I, LAWRENCE R. BLACKMORE, a subject of the Queen of Great Britain, residing at Newark, county of Essex, State of New Jersey, have invented certain new and useful Improvements in Sectional Boilers for Hot-Water and Steam Heating, fully described and represented in the following specification and the accompanying drawings, forming a part of the same.

This invention relates to that class of cast-iron boilers which is employed in circulating steam and hot water for heating purposes, and which is composed of flat vertical sections secured with their flat sides in contact and connected at the top and bottom for the steam and water circulation. All of the sections in the boiler are provided with water-legs and a fire-arch, which constitute the fire-box over the grate, but the sections are modified above the fire-arch, so that three patterns are required to form the boiler, one pattern for the main sections, which are all of similar shape, and two patterns for the rear two sections, which are hollowed upon their adjacent sides above the fire-arch to form the smoke-box. Each of the main sections is formed across the top with a horizontal circulating-chamber from which vertical water-legs extend nearly to the bottom of the section, and inner water-legs connected with the same near the bottom are extended up by the sides of the fire to the water-arch, which is connected with the circulating-chamber by vertical water-tubes. One of the water-tubes is placed to form a direct connection from the top of the inner water-leg to the circulating-chamber, and the connection of the two water-legs at the top and bottom thus furnishes space for ascending and descending currents, which are absolutely essential in heating the water in a boiler. The water-legs are connected at the bottom by a water-chamber, and a dead-air space is secured between the two water-legs for the height of the fire-box by making the inner water-leg of the same thickness as the section, while the water-tube which extends upward from the inner water-leg is of less thickness, to permit the lateral movement of the gases. The return-pipe or water-inlet is connected with the water-chamber below the bottom of the dead-space, so that the water may readily enter the inner water-leg, in which an upward current is generated by the heat. The sections in this boiler differ from others especially in having the outer water-legs extended above the top of the section and looped or recurved backward into the circulating-chamber at a suitable distance from the middle line of the section to admit a water or steam drum, connected upon opposite sides with outlets upon the contiguous sides of such loops. The recurved ends of such loops join the water or circulating chamber near the tops of the central water-tubes in which the rising current is most rapid, and thus furnishing a passage for such water to the downward current in the outer water-leg when no water is being drawn from the boiler, and an internal circulation is essential to prevent the burning of the metal adjacent to the fire.

The space within each loop is employed as the principal smoke-flue of the boiler, and the water-chamber is notched at its opposite sides, and the water-tubes, as well as the fire-arch, are made of less thickness than the section to permit a free passage for the gases from the fire-box to such flues. The gases, when the direct-draft damper is closed, pass from the flues into the smoke-box between the two rear sections, and escape by a smoke-outlet which is formed in the rear section below the level of the flues.

The rear section is formed of a water-plate which extends from the top to the bottom of the section, the lower part receiving the heat from the fire and the upper part absorbing the waste heat from the escaping gases. The section next to the rear is also formed, above the fire, of a water-plate which is perforated in the center opposite to the smoke-outlet in the rear section, and furnished with a damper, to provide a direct draft for use when kindling the fire. Vertical projections similar to the water-tubes in the main sections are formed upon the front side of this water-plate.

The recurved portions of the loops are formed upon their adjacent faces with outlets, and a header is arranged between the loops of all the sections, and connected with the outlets by suitable pipes or couplings. The portions of the loops in which the outlets are formed are enlarged in cross-section to form vertical water-columns which, when the boiler is used for circulating hot water, lead the water freely upward from the circulating-chamber to the outlets. The boiler is furnished with no return-flues, but the gases pass directly upward between the main sections into the flue-spaces in the upper corners of the same. To prevent the gases from passing into the smoke-chamber too rapidly, the spaces between the water-chambers which lead upward into the flue-passages are closed adjacent to the rear sections by removable plates or stoppers and the cast-iron front of the boiler is furnished with doors through which such plates may be inserted or removed. The rising gases are thus driven first to the front of the boiler and then pass backwardly through the flues to the smoke-chamber.

The construction is especially adapted for boilers of considerable size, in which an integral section would involve a very large and expensive casting, and the section is thus preferably made in halves by dividing the water-chamber and the fire-arch at the center line. As the section is provided with two outlets upon the adjacent faces of the two loops above the water-chamber, each half is thus furnished with an outlet from which water or steam passes to the connecting-header. To utilize such outlets, the recurved ends of the loops are united to the top of the water-chamber at one side of the dividing-line between the two halves, which not only brings the recurved ends of the loops over the most-highly-heated tubes, but permits the insertion of a header between the two loops, with connections upon opposite sides to their separate outlets. Two apertures are made through the rear section at opposite sides of the smoke-outlet for the application of check-draft dampers, so that the boiler may possess a check-draft in a convenient location for application when either side of the boiler is set against a wall. The sections are provided, below the water-chambers at the bottoms of the water-legs, with feet which project downwardly to form the sides of the ash-pit, and the feet upon the rear section are connected by a plate having an opening with a frame bolted thereto and provided with draft-slide to furnish air for combustion to the rear of the furnace as well as to the front.

The invention will be understood by reference to the annexed drawings, in which—

Fig. 9 is a longitudinal vertical section of the boiler with the boiler-front and the first three and a half sections divided upon the line 8 8 in Fig. 4, cutting the fire-arch and the circulating-chamber close to the middle of the section. The remaining four and a half sections toward the rear of the boiler are divided upon the line $x\ x$ in Fig. 4 close to the inner side of the inner water-leg to show the passage of the gases through the flues into the smoke-box. The section-line through the smoke-box intersects one of the check-damper openings which is shown in Figs. 3 and 5 closed by a door, while the opening at the opposite side of the smoke-outlet is furnished with a check-draft damper. Fig. $9^a$ is a plan, and Fig. $9^b$ an end view, of the header G.

A designates the fire-box sections, B the section next the rear, and C the rear section.

The front of the furnace is closed by a boiler-front D, having fuel-door D', ash-pit door $D^2$, and cleaning-out doors $D^3$ and $D^4$.

Sockets E are formed upon the inner sides of the water-legs to support the grates E'. The outer sides of the water-legs are connected together at the bottom by manifolds F and inlets F', and the sections are connected at the top by header G and pipes G'. The grate and fire-box extend through all of the sections, and the sections are all provided at each side of the fire-box with inner and outer water-legs I and J, the inner legs I being connected by the fire-arch O, and the outer water-legs being connected near the top of the section by the circulating-chamber N. Vertical water-tubes $n$ connect the fire-arch and the circulating-chamber, and a water-tube $i$ is extended from the top of the water-leg I directly upward to the circulating-chamber. The water-legs are made of the same thickness as the section, and the heated gases are thus prevented, at the sides of the fire-box, from passing into the dead-space between the inner and outer water-legs.

Figure 4:
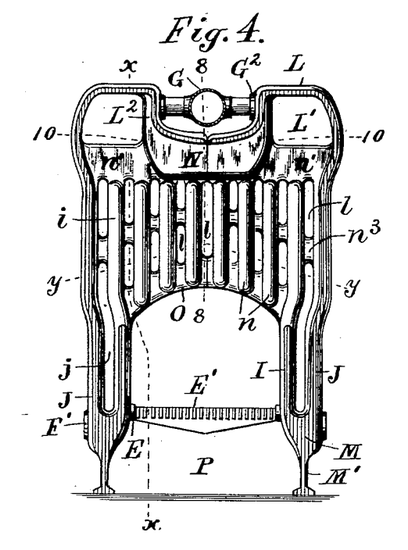
Fig. 4 is an elevation of one of the main sections.
Figures 9, 9A, 9B:
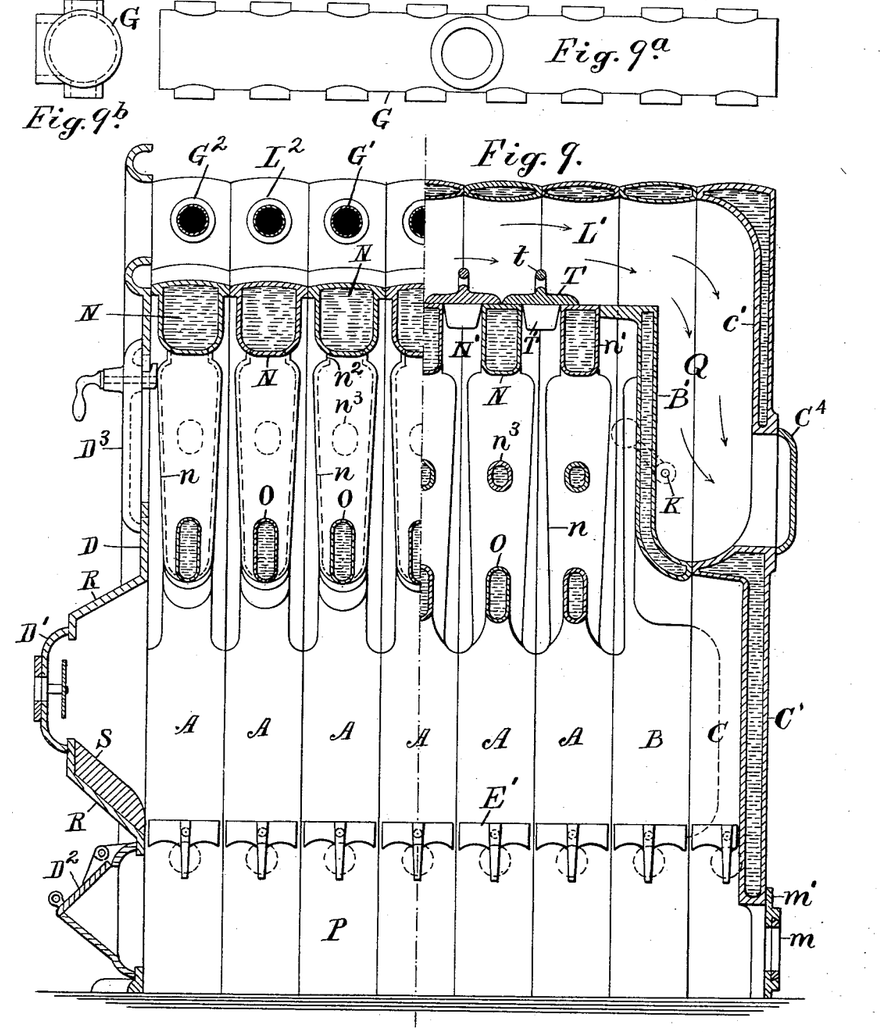

The water-legs I and J are connected below the level of the grate by a water-chamber M, having each a water-inlet below the dead-space $j$ to receive the pipe F''. Any number of the sections A, which are all alike, may be used to construct a boiler of given capacity, the rear two sections being the same, whatever number of the other sections be used. The outer water-legs J are carried to the top of the section, and provided with extensions which form in the sections A and B loops L and flues L', the inner end of each loop being enlarged where it is turned downwardly into the circulating-chamber N and provided upon its inner side with an outlet $G^2$. Such enlarged portion $L^2$ of the loop may be termed a "water-column" or "steam-column," as it forms a vertical passage from the water-chamber to the outlet $G^2$. In the sections A, as shown in Figs. 4 and 9, the chamber N is at the middle of its length nearly as thick as the section, but is formed upon opposite sides, below the flues, with notches $n'$ to admit the gases upwardly between the sections to the flues. The tubes $n$ and $i$, as shown in Fig. 9, are about the same thickness as the middle of the chamber N, which is a little less than the section in thickness, so as to admit the gases against its sides, as shown in Fig. 9.

The tubes are tapered downwardly to the fire-arch O, which is much thinner than the thickness of the tubes, to permit the gases and the radiant heat to pass upward freely between the arches into contact with the chamber N above. The gases, moving upwardly, pass between the bodies of the tubes $n$ and into the spaces $l$ between the tubes, and then through the notches $n'$ upon the sides of the chamber N into the flues $L'$. The gases also circulate between the middle portions of the chambers N where such chambers are slightly separated, as shown in Fig. 9, but are wholly excluded from the dead-space J at the sides of the fire-box, as there is nothing to induce a downward draft into such spaces.

Figure 5:
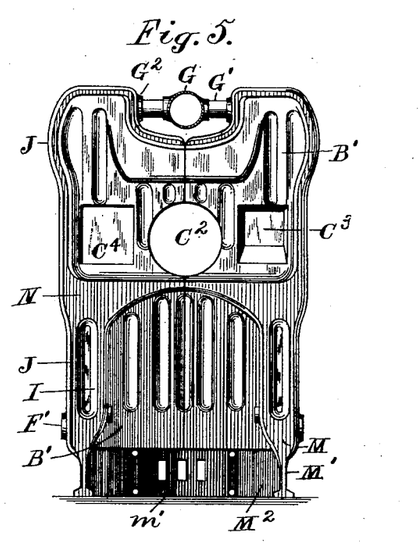
Fig. 5 shows the inner side of the rear section.
Figure 6:
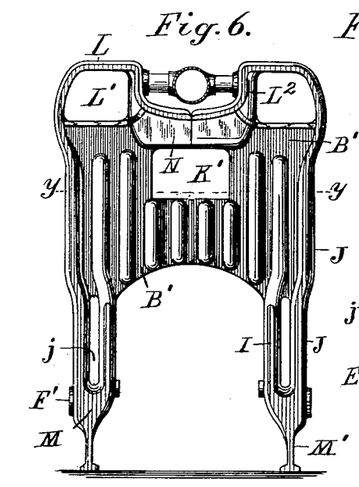
Figs. 6 and 7 show, respectively, the front and rear sides of the section next to the rear.

The section C, as shown in Fig. 5, is formed of the hollow water-plate $C'$, having upon its inner sides projections in connection with the water-space of the plate, and corresponding in form with the fire-arch, the water-legs I and J, and the middle portion of the water-chamber N.

Figure 3:
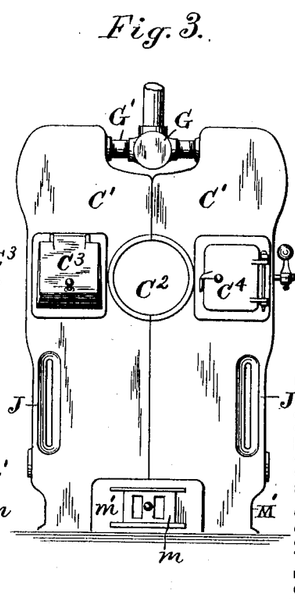

Just above the fire-arch is the central smoke-outlet $C^2$, at each side of which is an opening for the check-draft damper, such damper being shown at $C^3$, and a door $C^4$ closing the other opening. The section is shown divided in vertical halves, and is provided with the water-outlets $G^2$, corresponding to those upon the sections A. All the sections have feet $M'$, projected downward from the chambers M to form the sides of the ash-box P, and a plate $M^2$ is, in the section C, connected with the feet and with the plate $C'$ (upon each half of the section C) with an opening $m^2$ in such plate to which a frame $m'$ is applied and provided with the draft-slide $m$, as shown in Fig. 3.

Figures 7, 8:
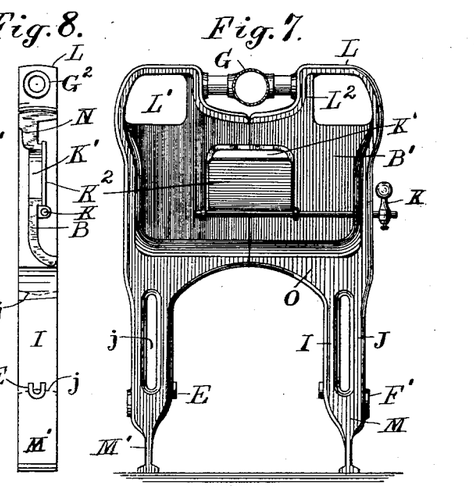
Fig. 8 is an edge view of one of the halves of this section, viewed from the middle of the section.

The section B is formed, as shown is Fig. 7, with the plate $B'$ above the fire-arch O, and the water-leg J and its looped extensions L are carried around the edge of such plate to form, with the similar parts of the section C, the enlarged smoke-box, (lettered Q in Fig. 9.)

The plate $B'$ in section B is formed with the direct-draft opening $K'$, with the damper $K^2$ hinged at its lower edge, and operated by shaft and handle K.

A box R with sloping bottom is formed upon the front D to carry the fuel-door $D'$, and the sloping bottom is lined with a brick S, which slopes from the level of the grates upwardly to the door. Such brick forms an inclined floor to facilitate the raking of the cinders from the surface of the grate out of the door, while it secures a suitable depth of the grate-bars below the inlet for the fuel, which greatly assists the fireman in the distribution of the fuel in the rear part of the furnace.

Figure 1:
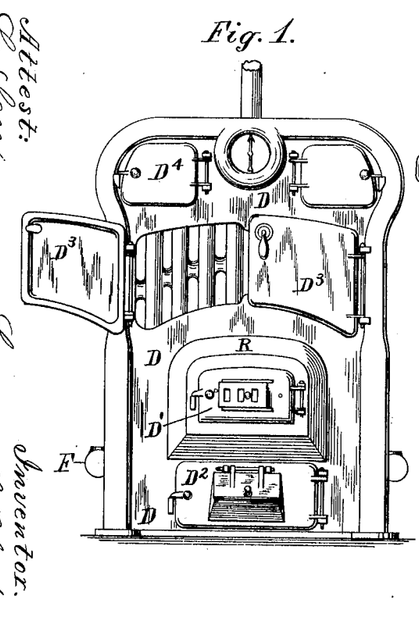
Figure 1 is a front elevation of the boiler.
Figure 2:
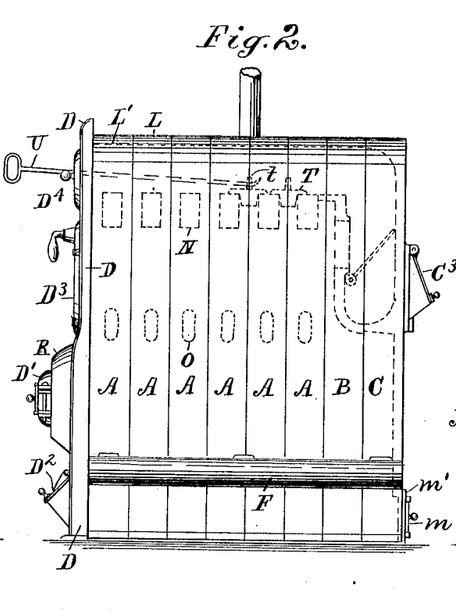
Fig. 2 is a side elevation, and Fig. 3 a rear elevation.
Figure 10:
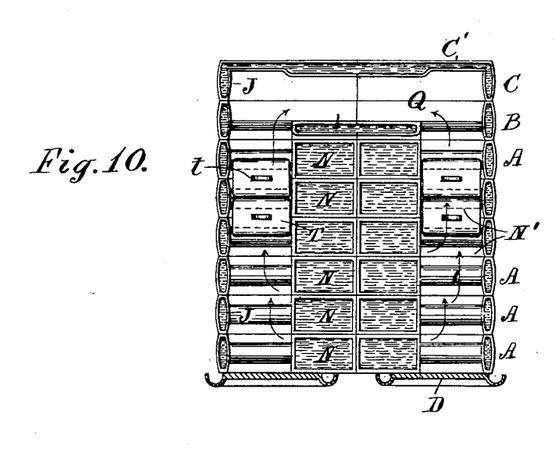
Fig. 10 is a horizontal section of the boiler through the flues on line 10 10 in Fig. 4.
Figure 11:
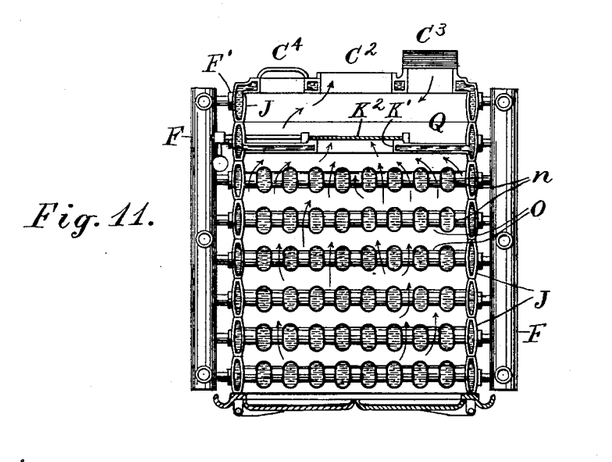
Fig. 11 is a horizontal section of the boiler just above the fire-arch on the dotted line $y\ y$ in Figs. 4 and 6.
Figure 12:
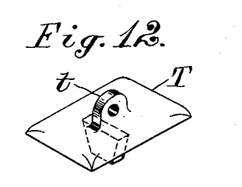
Fig. 12 is a perspective view of one of the draft-stoppers which are shown in plan in Fig. 10.

Fig. 12 is a perspective view of one of the draft-stoppers T, (shown in Figs. 9 and 10,) which consists of rectangular plates provided each, upon the bottom, with a lug $T'$ to fit the spaces $N'$ between the chambers N (formed by the notches $n'$) and provided upon the top with an eye $t$, by which they may be lifted and moved. The arrows $a$ in Fig. 9 show the movement of the gases upwardly between the fire-arches and tubes, and their deflection toward the front of the boiler is effected by the stoppers T, which are shown between the sections A, adjacent to the section B. A rod U is shown in Fig. 2 inserted through one of the flues $L'$ to insert or remove such stoppers, by insertion in the eye $t$; and by this means any number of the spaces $N'$ may be closed, in proportion to the degree of draft in the chimney.

It will be perceived that the boiler is adapted to operate with a very poor draft, as the gases are not carried through return-flues or turned downward within the boiler, excepting where they enter the upper part of the smoke-box and emerge from the lower part, as shown in Fig. 9, which affords an opportunity for the water-plates $B'$ and $C'$ to extract the heat from the gases before they escape.

By carrying the water-leg extensions L around the flues $L'$, the heat is extracted from the gases in its passage through such flues, and by locating the flues entirely above the circulating-chamber N, the gases may be conducted upwardly through the entire height of the sections. The entire body of the section thus constitutes an active heating-surface, and the gases are discharged only after they have acted upon the entire body of the section. The inner water-legs, the fire-arch, and the water-tubes $n$ and $i$ receive the greatest proportion of the heat, and the upward movement of the fluid is therefore rapid in such tubes.

Where the boiler is used for heating water, the passage from such tubes to the outlets $G^2$ is directly through the vertical columns $L^2$, which also connect with the descending channel formed by the outer water-legs, so as to secure a free circulation within the boiler itself whenever the external circulation is cut off. The connection of the external water-leg with the top of the water-column by means of the loop L furnishes an absolutely direct passage for all of the rising fluid in the boiler to move downwardly, where the external circulation is suddenly stopped, and the fire continues to heat the fluid.

Where the boiler is used for generating steam, the water-line would lie near the bottom of the chamber N, and as the outer water-leg connects with the ends of such chamber, it furnishes a similar return-channel for the water to the bottom of the boiler, after the steam has separated therefrom. In such case, the loops L and columns L² are filled with steam, which is heated and dried by the gases escaping through the flues L'.

The sections A, B, and C are shown divided vertically at the middle line, to facilitate the casting of such sections for large boilers, and especial claim is made herein to the half-section having the constructive features which are above described. The sections A may be denominated "flue-sections," and the sections B and C "smoke-box" sections.

Having thus set forth the nature of the invention, what is claimed herein is—

1. In a vertical sectional boiler, a flat section having double water-legs at the opposite sides, with a fire-arch connecting the inner water-legs, and a water-chamber connecting the outer water-legs near the top of the section, vertical water-tubes connecting the fire-arch with the water-chamber, and extensions of the outer water-legs above the water-chamber, recurved into the same at opposite sides of the center line, such extensions forming loops over the outer corners of the water-chamber, with flues for the heated gases within such loops, as and for the purpose set forth.

2. In a vertical sectional boiler, a flat section having double water-legs at the opposite sides, with a fire-arch connecting the inner water-legs, and a water-chamber connecting the outer water-legs near the top of the section, vertical water-tubes connecting the fire-arch with the water-chamber, and extensions of the outer water-legs above the water-chamber, recurved into the same at opposite sides of the center line, such extensions forming loops over the outer corners of the water-chamber with flues for the heated gases within such loops, and the contiguous sides of the loops being provided with the outlets G² to draw the heated fluid from the section, substantially as set forth.

3. In a vertical sectional boiler, a flat section having double water-legs at the opposite sides, with a fire-arch connecting the inner water-legs, and a water-chamber connecting the outer water-legs near the top of the section, vertical water-tubes connecting the fire-arch with the water-chamber, and extensions of the outer water-legs above the water-chamber recurved into the same at opposite sides of the center line, such extensions forming loops over the outer corners of the water-chamber with flues for the heated gases within such loops, and the inner water-legs being reduced in thickness for the passage of the heated gases, above the base of the fire-arch, and adapted to contact upon the edges of the adjacent sections at the sides of the fire-box, to form a dead-space between the water-legs at the lower part, as and for the purpose set forth.

4. In a vertical sectional boiler, a flat section having double water-legs at the opposite sides of the fire-box, with a fire-arch connecting the inner water-legs, and a water-chamber connecting the outer water-legs near the top of the section, vertical water-tubes connecting the fire-arch with the water-chamber, and extensions of the outer water-legs forming loops over the outer corners of the water-chamber with flues for the heated gases within such loops, the water-tubes having a thickness a little less than the section, and the fire-arch and that portion of the water-chamber below the flues being of still less thickness, to lead the gases freely into and out of the vertical passages between the tubes and conduct the same to the flues, substantially as herein set forth.

5. In a vertical sectional boiler, a flat section having double water-legs at the opposite sides of the fire-box, with a fire-arch connecting the two water-legs, and a water-chamber connecting the outer water-legs near the top of the section, vertical water-tubes connecting the fire-arch with the water-chamber, and extensions of the outer water-legs forming loops over the outer corners of the water-chamber with flues for the heated gases within such loops, the water-tubes having a thickness a little less than the section, and the fire-arch and that part of the water-chamber below the flues being of still less thickness, to lead the gases freely into and out of the vertical passages between the tubes and conduct the same to the flues, and the inner water-legs being adapted to contact upon the edges of the adjacent sections at the sides of the fire-box to form a dead-space between the water-legs at the lower part, and the inner water-leg having direct connection with the water-chamber by one of the vertical water-tubes, substantially as herein shown and described.

6. In a vertical sectional boiler, a flat section having double water-legs at the opposite sides of the fire-box, with a fire-arch connecting the inner water-legs, and a water-chamber connecting the outer water-legs near the top of the section, vertical water-tubes connecting the fire-arch with the water-chamber, and extensions of the outer water-legs forming loops over the outer corners of the water-chamber with flues for the heated gases within such loops, the fire-arch having a thickness less than the section and the water-chamber being notched upon the sides below the flues to conduct the gases upward into the same, substantially as herein set forth.

7. In a vertical sectional boiler, a flat section having double water-legs at the opposite sides of the fire-box, with a fire-arch connecting the inner water-legs, and a water-chamber connecting the outer water-legs near the top of the section, vertical water-tubes connecting the fire-arch with the water-chamber, and extensions of the outer water-leg curved outwardly and upwardly at the ends of the water-chamber, and formed into loops over the outer corners of the same, with flues for the heated gases within such loops, the loops having outlets upon the contiguous sides and sufficiently separated to admit a header and pipe connections with union-joints, substantially as herein shown and described.

8. In a vertical sectional boiler, a flat section having double water-legs at the sides of the fire-box, with a fire-arch connecting the inner water-legs and a water-chamber connecting the outer water-legs near the top of the section, vertical water-tubes connecting the fire-arch with the water-passages, and water-columns projected upward from the chamber at opposite sides of the center with outlets upon their contiguous faces, and space between such outlets to admit a header and pipe connections with union-joints, substantially as herein shown and described.

9. In a vertical sectional boiler, a flat section divided vertically in halves upon the middle line, each half-section having double water-legs at one side, a water-chamber extended across the top of the half-section, a half fire-arch projected from the inner water-leg to the dividing-line, with vertical water-tubes connecting such half-arch with the water-chamber, and an extension of the outer water-leg above the water-chamber recurved into the same at one side of the division-line, such extension forming a loop over the outer corner of the water-chamber with flue for the heated gases within such loop, substantially as herein set forth.

10. In a vertical sectional boiler, a flat section divided vertically in halves upon the middle line, each half-section having double water-legs at one side, a water-chamber extended across the top of the half-section, a half fire-arch projected from the inner water-leg to the dividing-line, with vertical water-tubes connecting such half-arch with the water-chamber, and an extension of the outer water-leg above the water-chamber recurved into the same at one side of the division-line, such extension forming a loop over the outer corner of the water-chamber with flue for the heated gases within such loop, and the water-chamber having notches N in its sides upon the outer corner below said flue, to conduct the gases upwardly into the same, substantially as herein set forth.

11. In a vertical sectional boiler, a flat section divided vertically into halves upon the middle line, each half-section having double water-legs at one side, a water-chamber extended across the top of the half-section, a half fire-arch projected from the inner water-leg to the dividing-line, with vertical water-tubes connecting such half-arch with the water-chamber, and an extension of the outer water-leg above the water-chamber recurved into the same at one side of the division-line, such extension forming a loop over the outer corner of the water-chamber with flue for the heated gases within such loop, and the fire-arch and water-tubes having a less thickness than the section, and the water-chamber having notches N in its sides upon the outer corner below the said flue, to conduct the gases upwardly into the same, as and for the purpose set forth.

12. In a vertical sectional boiler, a flat section made in halves, each half having double water-legs at one side, a circulating-chamber at the top, an extension of the outer water-leg forming a loop above the water-chamber with flue for the heated gases within such loop, a half fire-arch projected from the inner water-leg, and vertical water-tubes connecting such half-arch with the water-chamber, the fire-arch and water-tubes being less in thickness than the section, and the water-chamber below the flue having less thickness than the tubes to receive the gases from the vertical passages between the tubes, substantially as shown and described.

13. In a vertical sectional boiler, a flat section made in halves, each half having double water-legs at one side, a circulating-chamber at the top, an extension of the outer water-leg forming a loop above the water-chamber with flue for the heated gases within such loop, a half fire-arch projected from the inner water-leg, and vertical water-tubes connecting such half-arch with the water-chamber, the water-tubes having a thickness a little less than the section, and the fire-arch and that portion of the water-chamber below the flue being of still less thickness, to lead the gases freely into and out of the vertical passages between the said tubes, substantially as herein set forth.

14. In a vertical sectional boiler, a flat section made in halves, each half having double water-legs at one side, a circulating-chamber at the top, an extension of the outer water-leg forming a loop above the water-chamber with flue for the heated gases within such loop, a half fire-arch projected from the inner water-leg, and vertical water-tubes connecting such half-arch with the water-chamber, the water-tubes being at the top a little less in thickness than the section and tapering gradually downward, and the fire-arch and that part of the water-chamber below the flue being of still less thickness, to lead the gases freely into and out of the vertical passages between the said tubes, substantially as shown and described.

15. In a vertical sectional boiler, a flat section made in halves, each half having double water-legs at one side, a circulating-chamber at the top, an extension of the outer water-leg forming a loop above the water-chamber with flue for the heated gases within such loop, an outlet upon the inner side of such loop, the fire-arch and water-tubes being less in thickness than the section, and the water-chamber being of less thickness than the outer water-leg which forms the joint between the sections, and having also vertical notches N in its sides below the said flue to conduct the gases upward into the same, substantially as shown and described.

16. In a vertical sectional boiler, a flat section made in halves, each half having double water-legs at one side, a circulating-chamber at the top, an extension of the outer water-leg forming a loop above the water-chamber with flue for the heated gases within such loop, an outlet upon the inner side of such loop, the fire-arch and water-tubes being less in thickness than the section, and the water-chamber being of less thickness than the outer water-leg which forms the joint between the sections, and having also vertical notches N in its sides below the said flue to conduct the gases upward into the same, and the inner water-leg having the same thickness as the section to the top of the fire-box to guard the dead-space between the water-legs near the bottom, substantially as and for the purpose set forth.

17. In a vertical sectional boiler, a flat section made in halves, each half having double water-legs at one side, a circulating-chamber at the top, an extension of the outer water-leg forming a loop above the water-chamber with flue for the heated gases within such loop, a half fire-arch projected from the inner water-leg and connected by vertical tubes with the circulating-chamber, the said arch, tubes, and chamber being of less thickness than the section to admit the gases to the flue, and the inner water-leg below the top of the fire-box having the same thickness as the section to form a dead-space between the water-legs at the lower part, and an inlet M connecting the water-legs below such dead-space, with water-inlet below the bottom of such dead-space, substantially as shown and described.

18. In a vertical sectional boiler, a flat section made in halves, each half having double water-legs at one side, a circulating-chamber at the top, an extension of the outer water-leg forming a loop above the water-chamber with flue for the heated gases within such loop, a half fire-arch projected from the inner water-leg and connected by vertical tubes with the circulating-chamber, the said arch, tubes, and chamber being of less thickness than the section to admit the gases to the flue, and the inner water-leg below the top of the fire-box having the same thickness as the section to form a dead-space between the water-legs at the lower part, and an inlet M connecting the water-legs below such dead-space, with water-inlet below the bottom of such dead-space, supports for grates upon the inner water-leg adjacent to the bottom of the dead-space, and a foot M' (having the thickness of the section) projected downward from the chamber M to form the sides of an ash-box below the grate, substantially as herein set forth.

19. In a vertical sectional boiler, a rear section having the water-plate C extended from top to bottom with the half water-legs projected from the plate at opposite edges, and formed at the upper corners of the plate with loops having pipe connections upon their contiguous sides, the water-legs being throughout of the same thickness as the section and being connected by the fire-arch C' forming, in the upper half of the section, a smoke-box $C^2$ in the center and check-draft door $C^4$ at one side, substantially as shown and described.

20. In a vertical sectional boiler, a rear section made in halves, each half having the water-plate C' extended from top to bottom with the half water-leg projected from the plate along one edge, and formed at the upper corner of the plate with the loop U having outlet as set forth, the water-leg being throughout of the same thickness as the section, and having the half fire-arch O, the half smoke-outlet $C^3$, and the draft-opening $C^4$, the half fire-arches forming with the water-legs and their extensions a smoke-box in the upper half of the section with a draft-opening at each side of the smoke-outlet, substantially as shown and described.

21. In a vertical sectional boiler, a rear section made in halves, each half having the water-plate C' extended from top to bottom with the half water-leg upon the edge of the plate having extension forming the loop at the top corner of the same, and having the half fire-arch, the half smoke-outlet, and the half ash-pit draft-opening, the half fire-arches forming with the water-legs and their extensions a smoke-box in the upper half of the section, and the sections being connected at the lower end by the ash-pit-draft-door frame $m'$ secured to the same, and the loops having water-outlets upon their contiguous faces, substantially as herein shown and described.

22. In a vertical sectional boiler, a rear section having the water-plate C' extended from top to bottom, and provided upon one side with the outer water-legs J, the loops L having outlets L', the inner water-legs I and the fire-arch O connecting the same and the outer legs J, and forming with the loops a smoke-box in the upper part of the chamber, such smoke-box being provided with the smoke-outlet and draft-openings, and the independent water-legs at each edge of the section providing an upward and downward circulation from the fire-arch, substantially as shown and described.

23. In a vertical sectional boiler, a rear section having the water-plate C' extended from top to bottom, with the inlet-chambers M connected with the same side of the plate at opposite edges, two water-legs extended upward from each chamber, the inner water-legs being connected with the plate C' and united by a fire-arch, as set forth, and the outer water-legs connected with such fire-arch and continued upward along the edge of the section and formed into a loop at the top of the same, the fire-arch and the extensions of the water-legs forming in the upper half of the section a smoke-box having smoke-outlet, and the water-chambers M having the feet M' projected downwardly and connected by the plate M², having the opening $m^2$, with the frame $m'$ connecting the two sections together and provided with the draft-slide $m$, substantially as shown and described.

24. In a vertical sectional boiler composed of a series of flat sections, the section B having the water-plate B' upon the upper half with the fire-arch O projected from one side of the same and the outer water-leg J, extended downward from the fire-arch and upward along the edge of the section, with extension forming the loop L, the inner water-leg connected with the fire-arch and with the outer water-leg at the bottom by chamber M, the flue-openings L' through the corners of the section, and the direct-draft opening K' provided with damper K², substantially as shown and described.

25. In a boiler provided with a series of flat sections and having fire-box sections A provided each with water-chamber across the top and fire-arch connected with such chamber by vertical tubes, and having in the corners flue-openings connected with the spaces between such tubes, the means for discharging the gases from the boiler, consisting of the section B having the water-legs I J, and plate B' provided with the direct-draft opening K' having damper K² and with the flue-openings L', and having upon the rear side the fire-arch O, and the extensions of the water-legs J along the edges of the plate and over the flue-openings, and the inner leg I connected with the fire-arch and with the leg J by chamber M, and the rear section C having at the outer side the plate C' extended from top to bottom of the same to close the rear of the fire-box, and provided upon the inner side with the chambers M, water-legs I, J, looped extensions L, and fire-arch O arranged as set forth, and smoke-outlet C² through the plate just above the fire-arch, the adjoining spaces above the fire-arches of the two sections forming a smoke-box receiving the smoke at pleasure through the flue-openings L' or the draft-opening K, substantially as herein set forth.

26. In a vertical sectional boiler, a flat section made in halves, each half having a water-chamber at the top with the column L² projected upwardly therefrom and provided with an outlet, the section having a fire-arch connected with such water-leg and with the chamber by water-tubes, and the said column having connection at the top with the water-leg to form a direct channel from the top of the boiler to the bottom through the said water-leg when the outer circulation of the boiler is cut off, substantially as herein set forth.

27. A vertical sectional boiler composed of a series of flat sections secured together, and having each water-legs at the bottom, and water-chamber near the top, and fire-arch connected thereto by water-tubes, with spaces between the sections for the upward movement of the gases, and flues extended within the sections over the top of the water-chamber, and a rear section with smoke-box inside the same, connected to such flues, with an outlet to draw the smoke therefrom, as and for the purpose set forth.

28. A vertical sectional boiler composed of a series of flat sections secured together, and having each water-legs at the bottom, and water-chamber near the top, and fire-arch connected thereto by water-tubes, with spaces between the sections for the upward movement of the gases, and flues extended within the sections over the tops of the water-chamber, and two rear sections provided each with a water-plate in the place of water-tubes, and hollowed upon their adjacent sides to form a smoke-box connecting with the said flues, such smoke-box being provided with a smoke-outlet, substantially as herein set forth.

29. A vertical sectional boiler composed of a series of flat sections secured together, and having each water-legs at the bottom, and water-chamber near the top and fire-arch connected thereto by water-tubes, with spaces between the sections for the upward movement of the gases, and flues extended within the sections over the tops of the water-chamber, and a rear section with smoke-box inside the same connected to such flues, a smoke-box upon the middle line of such section, and openings for check-draft dampers at opposite sides of such smoke-outlet, to facilitate the application of a check-draft damper at either side of the boiler, as may be required, substantially as herein set forth.

30. In a vertical sectional boiler, a series of flat flue-sections, each section being formed in halves having a water-leg, a half fire-arch, and a half water-chamber connected thereto by vertical water-tubes, and an extension of the water-leg over the top of the water-chamber having outlet thereon, and forming flue above the water-chamber, substantially as set forth.

31. In a vertical sectional boiler, a series of flat flue-sections, each section being formed in halves having a water-leg, a half fire-arch, and a half water-chamber connected thereto by vertical water-tubes, and an extension of the water-leg over the top of the water-chamber having outlet thereon, and forming flue above the water-chamber, and the opposite sides of the water-chamber being formed with the notches $n'$ to admit the gases freely to such flues, substantially as herein set forth.

32. In a vertical sectional boiler, a series of flat flue-sections, each section being formed in halves having a water-leg, a half fire-arch, and a half water-chamber connected thereto by vertical water-tubes, and an extension of the water-leg over the top of the water-chamber having outlets thereon, and forming flue above the water-chamber, the outlets being formed upon the contiguous sides of the loops, and the sections being connected with opposite sides of a header, and the opposite sides of the water-chamber being formed with the notches $n'$ to admit the gases freely to the flues, substantially as herein set forth.

33. A vertical sectional boiler composed of a series of flat flue-sections, each section being formed in halves with two water-legs at one side, of the full thickness of the section, a water-chamber at the top connected with the outer water-leg, a fire-arch connected with the inner water-leg and with the water-chamber by vertical water-tubes, an extension of the outer water-leg forming a loop over the top of the water-chamber with flue inside the loop, and the space between the water-legs below the fire-arch being excluded from the circulation of the gases, substantially as herein set forth.

34. A vertical sectional boiler comprising the sections A provided each with water-legs, fire-arch, water-chamber, vertical water-tubes, and extension of the outer water-leg forming flue above the water-chamber, the section B having the plate B' above the fire-arch O and the flue-openings through such plate, and the section C closing the end of the fire-box and having plate above the fire-arch provided with smoke-outlet, the sections B and C being hollowed to form a smoke-box, substantially as herein shown and described.

35. A vertical sectional boiler comprising the sections A provided each with water-legs, fire-arch, water-chamber, vertical water-tubes, and extension of the outer water-leg forming flue above the water-chamber, the section B having the plate B' above the fire-arch O with the flue-openings through such plate, and the section C closing the end of the fire-box and having plate above the fire-arch provided with smoke-outlet, the sections being made each in half and having outlets at the top connected with a common header, and the half-sections having feet M' below the water-legs to close the sides of the ash-pit, and the section C being formed at the bottom with the plate $M^2$ having the opening $m^2$ with the frame $m'$ arranged to connect the halves of the section at the bottom and provided with the draft-slide $m$, as and for the purpose set forth.

36. A vertical sectional boiler composed of a series of flat sections secured together, and having each water-legs at the bottom, and water-chamber near the top, and fire-arch connected thereto by water-tubes, with spaces between the sections for the upward movement of the gases, and flues extended within the sections over the tops of the water-chamber, a smoke-box at the rear of the boiler connected with such flues and provided with a smoke-outlet, the water-chambers being notched at opposite sides below the flues, and removable flue-stoppers being fitted to certain of the spaces formed by such notches to direct the gases toward the front of the boiler, substantially as herein set forth.

In testimony whereof I have hereunto set my hand in the presence of two subscribing witnesses.

LAWRENCE R. BLACKMORE.

Witnesses:
L. LEE,
THOMAS S. CRANE.